April 25, 1939.   L. L. SCHAUER   2,155,687
SAFETY MANUAL AND POWER SPINDLE DRIVE
Original Filed Dec. 13, 1935   3 Sheets-Sheet 1

INVENTOR
Lawrence Lee Schauer
BY
Albert F. Nathan
ATTORNEY

April 25, 1939.   L. L. SCHAUER   2,155,687
SAFETY MANUAL AND POWER SPINDLE DRIVE
Original Filed Dec. 13, 1935   3 Sheets-Sheet 2

INVENTOR
Lawrence Lee Schauer
BY
Albert F. Nathan
ATTORNEY

April 25, 1939.  L. L. SCHAUER  2,155,687
SAFETY MANUAL AND POWER SPINDLE DRIVE
Original Filed Dec. 13, 1935   3 Sheets-Sheet 3
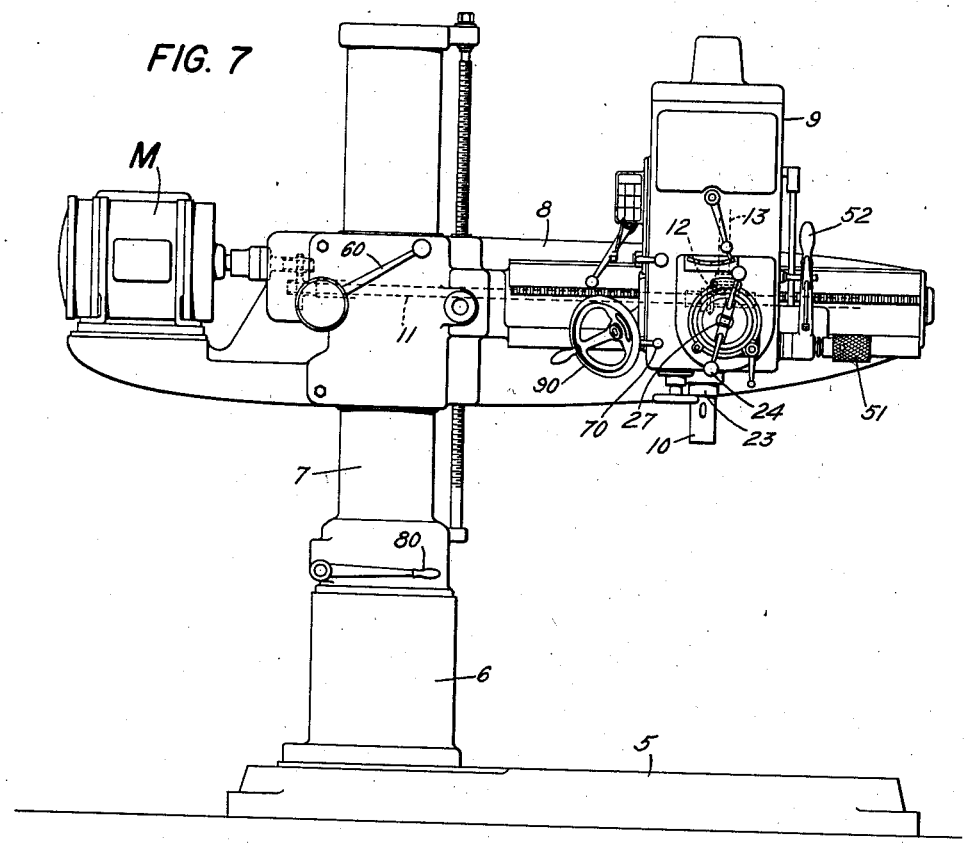
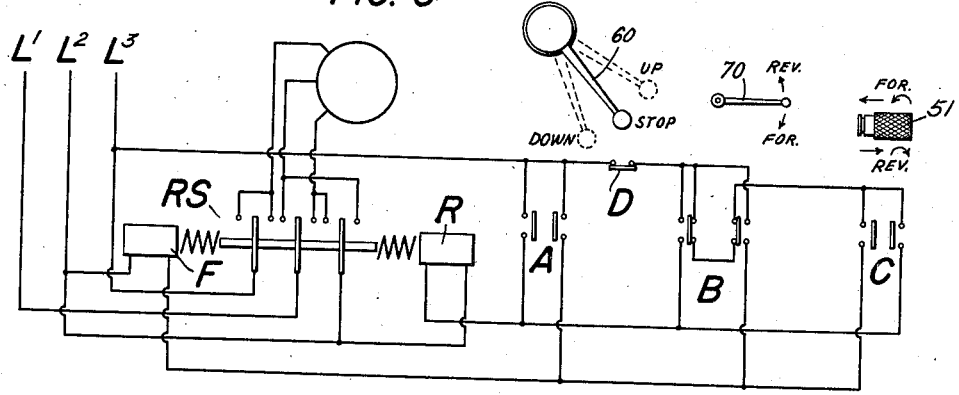
INVENTOR
Lawrence Lee Schauer
BY
Albert F. Nathan
ATTORNEY Patented Apr. 25, 1939

2,155,687

UNITED STATES PATENT OFFICE

2,155,687

SAFETY MANUAL AND POWER SPINDLE DRIVE

Lawrence Lee Schauer, Wyoming, Ohio, assignor to The Cincinnati Bickford Tool Company, Cincinnati, Ohio, a corporation of Ohio Original application December 13, 1935, Serial No. 54,206. Divided and this application September 10, 1936, Serial No. 100,116

9 Claims. (Cl. 77—33)

The present invention relates to drilling machines and particularly to an improved means for controlling the movements of the spindles of such machines. For a more complete illustration and description of a machine to which the present invention is particularly adapted, reference may be had to my copending parent application Serial No. 54,206, filed Dec. 13, 1935, of which this application is a division.

A primary aim of the invention is to overcome and eliminate a disadvantage existing in spindle power feed throw-out devices heretofore in use. Usually, such devices were arranged with a maximum limit-dog designed and arranged to throw out the power-feed at the extreme lower limit of movement of the spindle. Any further movement of the spindle, whether caused accidentally or by the hand or power feed, or by the tool pulling itself into the work, brought the teeth of the feed pinion into engagement with the uncut portion of the spindle sleeve. In a comparatively short time one or more teeth of the feed pinion became severely battered and deformed and likewise that portion of the spindle sleeve with which it came in contact. Consequently, undue sticking of the spindle sleeve in its bearings and improperly meshing pinion teeth resulted, and it soon became necessary to tear down the machine and replace the spindle sleeve, bearings, and feed pinion.

The present invention undertakes to overcome and prevent the abuse above mentioned and it accomplishes that object by providing a mechanism that will operate to throw out the power feed automatically as the spindle nears either end of the cut portion of the rack, and thereafter, operating as a positive stop for the spindle to prevent the pinion from engaging uncut portions. The feed pinion is thereby positively restrained from moving further and no damaging or marring of portions of the spindle sleeve can occur. In this way a double safety is provided which insures that the power feed will be thrown out automatically at a safe point even though the usual depth gauge or dial be set to a point beyond the end of the normal travel of the spindle, and in no event will the feed pinion or sleeve become injured.

In the performance of tapping operations on a radial drill, for example, it is necessary to swing the radial arm angularly about the column of the machine and to adjust the head on the arm so as to bring the axis of the spindle directly over the hole to be threaded. Heretofore, the locating of the tool relative to the work was effected by a number of distinct operations, and was further complicated because of the danger present in inadvertently allowing the tap to hang close to the surface of the workpiece as the arm was swung or the head moved thereon. It was customary therefore for the user to elevate the tap and spindle a safe distance while swinging the arm and adjusting the head on the arm. This mode of operation involved the manipulation of a number of different levers and controls which was very confusing and resulted in the loss of valuable time in setting up operations and in properly locating and controlling the actions of the tool.

A further aim of the present invention is to render available a drilling machine having an improved manually operable spindle feeding means, in addition to and auxiliary to the usual or conventional quick traverse levers at the front of the drill head, whereby an operator may quickly and efficiently adjust the tool spindle toward or away from the work and simultaneously locate the spindle directly over the point where the tooling operation is to be performed.

This invention also aims to render available a drilling machine tool in which the controls for the spindle rotating means, including the starting, stopping and reversing thereof, are combined and coordinated with the arm locating and spindle translating control means, and into a single lever or operating instrumentality arranged as a supplement to the individual control levers heretofore customarily provided. And as an additional improvement, to arrange the safety spindle throw-out and stop devices, above mentioned, as to coact also with the supplementary spindle translating means in protecting the spindle sleeve and feed pinion against undue overrun and consequent damage.

In attaining the objectives of this invention it is proposed to provide an additional gear on the feed pinion shaft, which gear will at times be the driver for an improved spindle throw-out and stop device, and at other times be the driven gear of an auxiliary manual feed train. The auxiliary manual feed train also is arranged to drive the spindle throw-out and stop mechanism which functions at all times to insure that the spindle, whether its translation is effected manually or by power, or accidentally, is brought to a definite stop before the spindle sleeve or pinion is damaged.

The manually operable lever of the auxiliary feed train is arranged to serve also as a handgrasp through which the arm of the drill may be shifted in locating the tool, and also as a means whereby the rotary movements of the tool may be started, stopped, or reversed at any time. Thus, complete control of the spindle movements is, by this invention, embodied in a single lever.

Other objects and advantages will be in part indicated in the following description and in part rendered apparent therefrom in connection with the annexed drawings.

To enable others skilled in the art so fully to apprehend the underlying features hereof that they may embody the same in the various ways contemplated by this invention, drawings depicting a preferred typical construction have been annexed as a part of this disclosure, and, in such drawings, like characters of reference denote corresponding parts throughout all the views, of which:

Fig. 1 of the drawings illustrates a sectional view of a radial drill tool head and portions of the spindle drive and feed mechanism.

Fig. 6 is a diagrammatic figure of the electrical control circuits.

Fig. 7 is a front view of a radial drill embodying this invention.

Figure 5:
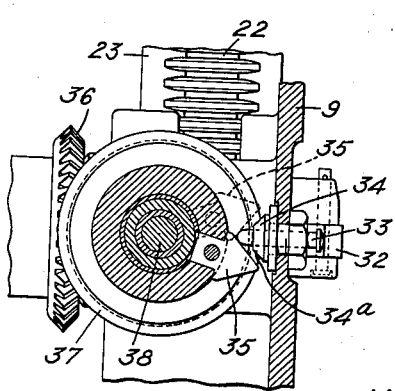
Fig. 5 is a section through lines 5—5 of Fig. 2.
Figure 1:
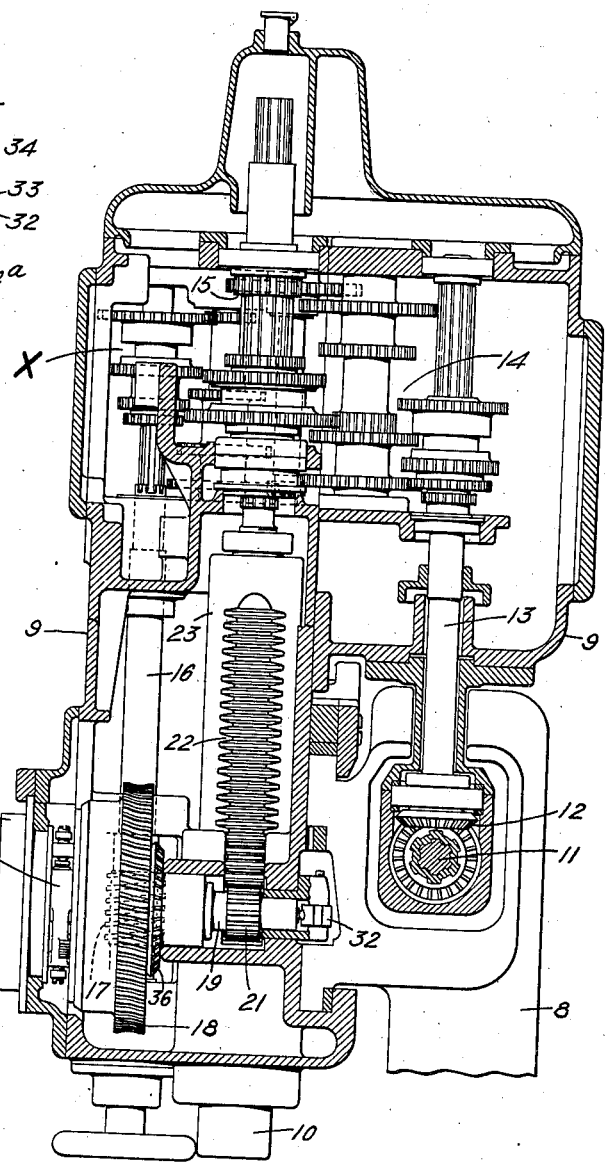
Figure 4:
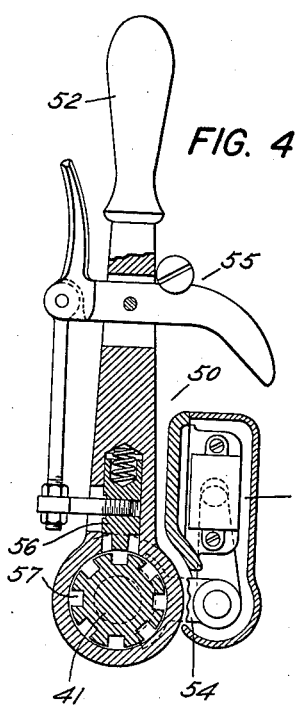
Fig. 4 is a view partly in section of an additional manual feed lever of the latch type.
Figure 2:
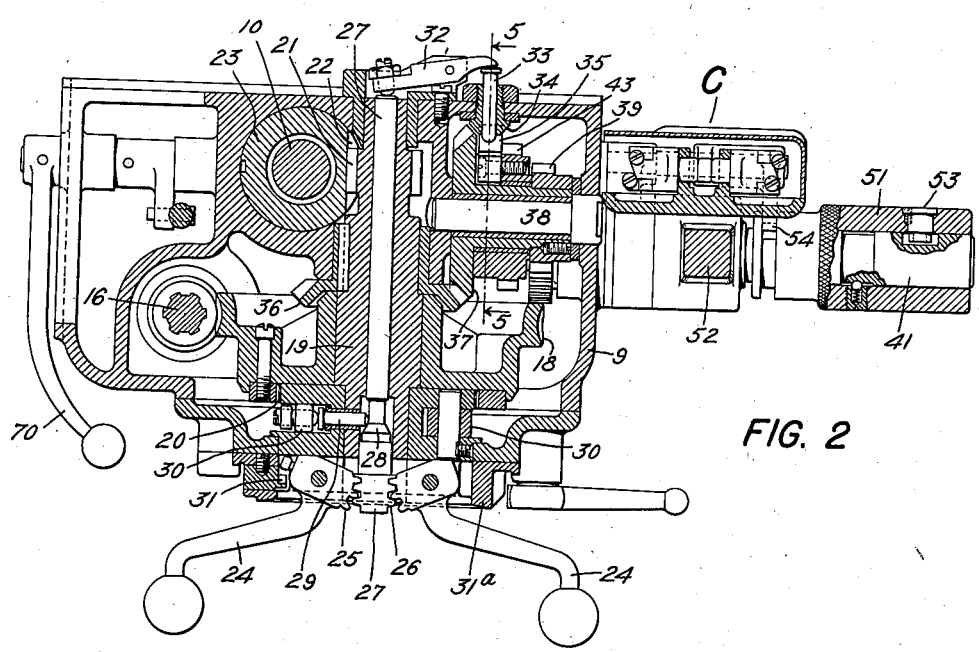
Fig. 2 is a horiontal section through the feed pinion shaft.
Figure 3:
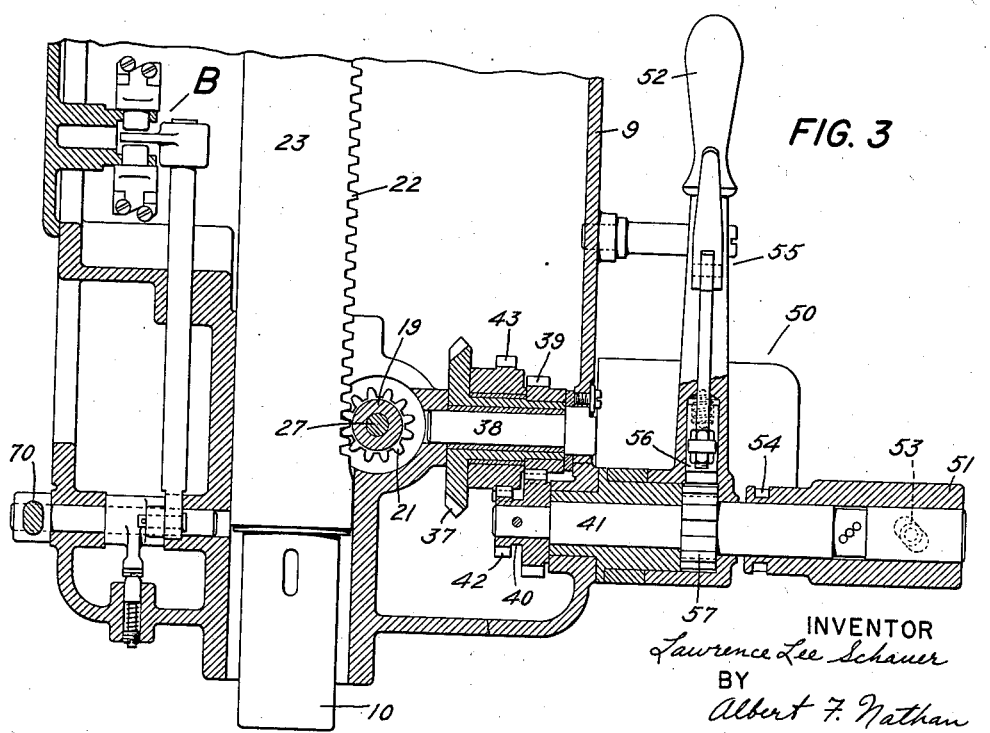
Fig. 3 is a vertical section of the tool head illustrating certain features of the auxiliary manual feed and spindle control mechanism.

The usual radial drill comprises essentially a base member 5, column 6 rising therefrom, a sleeve 7 on the column, an arm 8 vertically adjustable on the sleeve, and a tool head 9 mounted for translation along the arm.

The head 9 is fully enclosed and houses the gearing for rotating and feeding a tool spindle 10. The power for driving the spindle is derived from a reversible motor M carried upon the arm. The drive from the motor to the spindle includes an arm shaft 11, fully enclosed within the arm 8, a pair of bevel gears 12 which are suspended within the arm and conduct the power into the head 9 through the shaft 13. From the shaft 13 the power is caused to pass through the change speed gearing 14 whereby any one of nine different speeds to the spindle 10, ranging from 175 R. P. M. to 3500 R. P. M. may be affected.

The foregoing briefly describes the means for rotating the spindle, the means for feeding the spindle axially by power comprises a set of change gears X which receive power initially from a spindle gear 15 and transmit it to a feed shaft 16 at a predetermined rate. The lower end of the feed shaft 16 carries a worm gear 17 arranged to mesh with a worm wheel 18 which normally is free to rotate upon a feed pinion shaft 19. The wheel 18 may, however, through the medium of a positive toothed clutch 20 be selectively engaged with the pinion shaft 19 whereby the latter is driven at a rate proportionate to the rate of rotation of the spindle.

The inner end of the pinion shaft 19 carries a pinion 21 in mesh with rack teeth 22 cut in a non-rotatable spindle sleeve 23, and thus whenever the gear 18 is clutched to the shaft and the spindle is revolving, the spindle is simultaneously being fed axially.

Quick return levers 24 control the positioning of the power feed clutch 20 as follows: The inner ends of the levers are provided with gear segments 25 arranged to mesh with rack teeth 26 formed upon axially shiftable cam shaft 27. The shaft 27 is provided with a reduced portion and a cam surface 28 arranged to actuate a pair of radial pins 29 (one shown) which in turn operate spring pressed clutch actuating levers 30. Movement of the pins 29 radially outwardly effects engagement of the clutch, and the converse on inward movement. A depth dog 31 is provided, secured to an adjustable depth dial 31ª, for actuating the levers to a declutched position when a predetermined proper depth is reached.

The feed throw-out for the upper and lower limits of spindle travel also is adapted to operate upon the cam shaft 27 and includes a pivoted lever 32, one end of which engages the cam shaft and the other end a plunger 33.

The plunger 33 is carried in a conical bushing 34 fixed in space with respect to the movement of a spindle driven cam 35 which is actuated as follows: The pinion shaft 19 has keyed thereto a bevel gear 36 which meshes with a gear 37 journaled loosely upon a stub shaft 38. The bevel gear 37 forms one element of a branch transmission and carries at its outer end a gear 39 that meshes with a double gear unit 40. The gear unit 40 is fixed to an auxiliary actuating shaft 41 later to be referred to. The gear 42 of the double gear unit meshes with a cam carrier gear 43 loosely mounted upon the hub of the gear 37. The throw-out cam 35, previously mentioned is secured to the side of the gear 43 and is thereby caused to revolve synchronously with the feed pinion and in a plane containing the axis of the plunger 33 whenever the spindle is being moved axially.

The ratios of the gears 39–43 are so proportioned with respect to spindle travel that the cam 35 makes slightly less than one revolution for a full travel of the spindle, and the cam 35 so shaped that it engages the plunger 33 and kicks out the power feed a short distance before the pinion reaches the end of the rack teeth 22 on the spindle sleeve.

The engagement of the cam 35 with the plunger 33 does not of itself stop the spindle travel or act as a positive stop, but only disconnects the power feed. If the spindle is not properly balanced, it may move of its own weight a further distance, for example, to the point where the pinion 21 engages the uncut portion of the spindle sleeve 23 and causes the teeth to dig in or otherwise mar the surface thereof.

The present invention undertakes to prevent damage of this kind by the provision of means for definitely stopping the movement of the spindle before the uncut portion of the sleeve is reached and which also functions to yield a somewhat greater length of spindle travel under manual feed than under the power feed.

Fig. 5 illustrates more clearly the operation of the stop device which limits the spindle travel available by hand to a little more than that available by power. In the position illustrated, the cam 35 has just actuated and tripped out the power feed. The cam 35 may be given a further movement, however, in the same direction, as will later be explained, until the cam engages the conical surface 34ª of the fixed stop bushing 34. A short further movement is thus given to the spindle by hand which is very useful, particularly when using the manual feed exclusively. In the latter event the total available range of spindle movement is somewhat greater than the range of movement that can be effected by power.

Upon the reverse or upward movement of the spindle the mechanism is adapted to operate in a similar manner. The cam carrier wheel 43, being driven directly by the spindle through the reduction gearing described, revolves in the opposite direction and the other face of the cam 35 engages and actuates the plunger 33 and throws out the power elevating means. A slight further movement, it will be seen, brings the cam against the face 34ª of the bushing and axial translation of the spindle is again stopped before the pinion 21 can do damage to the spindle sleeve.

In the embodiment disclosed, the two-way acting power throw-out and spindle stop is particularly important in view of the reversible character of the entire drive and the innumerable times the machine will be set for a power feed down trip out, and the spindle elevated rapidly by its counterbalance mechanism. In the former case no damage is done to the mechanism if the operator inadvertently leaves the machine in reverse feed, and in the latter case, the upward movement of the spindle under its counterbalancing urge is stopped by the abutments provided instead of by the pinion and sleeve of the spindle. The conventional spindle traversing means includes the hand levers 24 which are connected directly with the feed pinion shaft 19 and which is used primarily for drilling operations to give a quick traverse movement of the spindle to the work and then to feed the drill into the work.

Relatively slower axial movements may be imparted to the spindle by means of the auxiliary manual feed mechanism 50 which includes a hand-grasp 51 and a supplementary lever 52. The hand-grasp 51 is mounted upon an extension of the shaft 41 and is connected therewith through a pin and slot connection 53. The slotted portion of the connection extends in a helical way around the shaft 41 and provides a limited axial and angular movement of the hand-grasp 51 relative to the shaft.

The axial motion is used to actuate a switch fork 54 which in turn actuates a forward and reverse motor control switch C, and when the lost motion of the pin and slot connection is taken up, continued angular movement of the hand-grasp 51 rotates the shaft 41, gears 40, 39, 37 and 36 and propels the spindle up or down and through 42 and 43, drives the cam carrier directly. It is to be observed also that the stop mechanism is arranged to function in the above explained manner also when the spindle is moved by either of the duplex manually operable means provided by this invention.

The switch means C is so related with the geared connections with the spindle that when the hand-grasp is actuated in a direction to feed the spindle down, the motor runs forwardly and when the hand-grasp is actuated in the reverse direction, through its neutral point, the motor runs in reverse and the spindle is propelled manually upwardly.

The supplementary lever 52 is normally loose on the shaft 41, but may be latched thereto by releasing the latch mechanism 55. This allows the plunger 56 to engage one of the notches 57 formed on an enlarged part of the shaft 41 and when so engaged the lever 52 may be moved fractional parts of a turn to feed the spindle up or down.

The electrical control circuit for the motor M is illustrated diagrammatically in Fig. 6, in which RS represents a reversing switch having forward and reverse solenoids F and R therein. The solenoids are controlled in the instant example by four switches A, B, C and D. The switches A and D are actuated by a column clamping and elevating control lever 60, the switch B by a forward and reverse control lever 70 mounted on the drill head, and the switch C by the hand-grasp 51. Switch C is in series with the switch B when the latter occupies the neutral position ilustrated in Fig. 6. A similar circuit is described more fully in my copending application, above referred to, and further description herein is thought unnecessary.

Suffice it to say that insofar as tapping operations are concerned, and assuming switches A, B and D to be in the positions illustrated, the operator has complete control over all of the spindle movements including starting, stopping, and reversing, through the hand-grasp 51. If he propels the spindle up or down manually by the hand-grasp or by the lever 52 too far, he is stopped by the positive safety stop above described.

The general operation of the machine for tapping is as follows: The operator releases the column clamp 89 which allows the arm to swing about the column. With one hand on the hand-grasp 51 and the other on the head traverse wheel 90 he can swing the arm and traverse the head thereon until the tap is located in the required position with respect to the work. Then without removing his hand from the hand-grasp 51, he gives it a turn toward him. That movement starts the spindle turning forwardly and also causes it to move axially and toward and into the workpiece. As soon as the threading tool takes hold, it feeds itself and the operator has to watch only for the point of reversal. When that point is reached, the operator twists the hand-grasp in the opposite direction and the tap backs out. As soon as it is in the clear, further rotation of the hand-grasp elevates the spindle and the workpiece may be repositioned for a succeeding threading operation.

Without further analysis, the foregoing will so fully reveal the gist of this invention that others can, by applying current knowledge, readily adapt it for various utilizations by retaining one or more of the features that, from the standpoint of the prior art, fairly constitute essential characteristics of either the generic or specific aspects of this invention and, therefore, such adaptations should be, and are intended to be, comprehended within the meaning and range of equivalency of the following claims:

Having thus revealed this invention, I claim as new and desire to secure the following combinations and elements, or equivalents thereof, by Letters Patent of the United States:

1. A drilling machine combining a translatable spindle sleeve; a toothed rack formed at one side thereof, said rack having blank portions at each end; a pinion meshing with said toothed rack adapted on rotation to translate said sleeve; manually operable means connected directly with said pinion for rotating same at a relatively rapid rate; a spindle stop mechanism permanently connected with and driven by said manual means operative to stop axial movement of said sleeve at a predetermined position prior to the engagement of said pinion with either one of said blank portions of the spindle sleeve; reduction gear connections between said stop mechanism and said first manually operable means; auxiliary manual means for rotating said pinion at a relatively slow rate, said means including part of said reduction gear connections, said stop mechanism thereby functioning as set forth irrespective of which of said two manually operable means is actuated.

2. A drilling machine combining a tool head; a translatable spindle sleeve therein; a toothed rack having an uncut portion at its lower end formed upon said sleeve; bearing means for slidingly receiving the lower end of said sleeve; a pinion shaft; a feed pinion on said shaft and meshing with said rack teeth; a first manual means directly connected with said shaft for rotating said shaft thereby to translate said spindle sleeve rapidly in either direction; a second manually operable means for rotating said pinion shaft at a slow rate in either direction including speed reduction gear connections between said second manually operable means and said shaft, said gear connection being actuated whenever said pinion shaft is rotated by either of said manual means; and means permanently connected with said reduction gearing coacting with a fixed stop in the drill head for definitely stopping the axial movement of said spindle sleeve at the upper end of its normal travel and prior to engagement of the teeth of said pinion with said uncut portion of said rack, said last mentioned means operating as set forth irrespective of the manual means operated to effect said translation.

3. A drilling machine combining a tool head; a translatable spindle sleeve; a toothed rack having uncut portions at each of its ends formed on said sleeve; a feed shaft; a feed pinion on said shaft and meshing with said rack teeth; a first manual means for rotating said shaft thereby to translate said spindle sleeve rapidly in either direction; a second manually operable means for rotating said pinion shaft at a slow rate in either direction including a speed reducing train of gears, said gears being actuated whenever said manual means is actuated to translate the spindle; and means permanently connected directly with said second manually operable means and coacting with a fixed stop in the tool head for definitely stopping the axial movement of said spindle sleeve prior to engagement of the teeth of said pinion with uncut portions of said rack, said last mentioned means operating as set forth irrespective of the direction of translation of said sleeve.

4. A drilling machine combining a tool head; a translatable tool spindle sleeve; rack teeth carried thereby; a feed pinion shaft; a feed pinion on said shaft meshing with said rack teeth; manually operable means directly connected with said shaft for driving said pinion; abutment means continuously driven by said shaft at a reduced rate and coacting with a fixed stop in the tool head for rendering said driving means positively ineffective at predetermined points in the axial position of said spindle; and auxiliary manually operable means operating through part of the driving means for the said continuously driven abutment means for actuating said feed pinion.

5. A drilling machine combining a translatable spindle sleeve; rack teeth formed upon said sleeve intermediate its ends with an uncut portion at each end thereof; a feed pinion meshing with said rack teeth adapted when rotated to effect translation of said sleeve; power means for driving said pinion; and means driven with said pinion and synchronously therewith for rendering said driving means ineffective at a predetermined point in the axial translation of said sleeve; and additional means coacting with said last named means and operative thereafter and prior to the engagement of the teeth of said pinion with the uncut portion of the said sleeve for positively stopping further movement of said driven means and said sleeve irrespective of the direction of translation of said sleeve.

6. A drilling machine combining a translatable spindle sleeve; rack teeth carried thereby intermediate its ends; a pinion shaft; a pinion on said shaft meshing with said rack teeth for propelling said sleeve axially in either direction; manually operable means permanently connected with said shaft for driving same; a transmission mechanism branching from said manually operable means; and spindle stop mechanism permanently connected with and continuously driven by said branch transmission, operative in both directions of spindle sleeve translation, for positively stopping the axial movement of said sleeve at both ends of its normally available travel.

7. A drilling machine combining a translatable spindle sleeve; rack teeth carried thereby intermediate its ends; a pinion meshing with said rack teeth for propelling said sleeve axially in either direction; power means for driving said pinion; means permanently automatically effective to render said power means ineffective at the normal extremes of sleeve movement; manually operable means for imparting a further axial movement to said sleeve beyond the extremes available by said power means; and means cooperating with said permanently effective means operative after the spindle has been moved said further distance, in either direction, to positively stop spindle movement before said pinion tends to overrun either end of the spindle rack teeth.

8. A drilling machine combining a cylindrical translatable spindle sleeve; a tool spindle rotatably journaled therein and translatable therewith; rack teeth cut upon one side of said sleeve beginning a substantial distance inwardly from each end thereof; a feed pinion meshing with said rack teeth and adapted upon rotation to translate said sleeve and spindle; power means including a clutch mechanism for rotating said pinion selectively in reverse directions; adjustable power feed throw-out means; means driven at a reduced rate from said power means for disconnecting the power drive to said pinion at the normal upper and lower extremes of sleeve movement including coacting abutment means thereafter operative upon a further axial movement of said spindle sleeve and prior to the engagement of the teeth of said pinion with an uncut portion of said cylindrical sleeve to positively stop further axial translation thereof, said last mentioned means operating as set forth in each direction of spindle movement.

9. A drilling machine combining a tool head; a translatable spindle sleeve; rack teeth carried thereby intermediate its ends; a pinion meshing with said rack teeth for propelling said sleeve axially in either direction; power means including a clutch mechanism for driving said pinion selectively in reverse directions; manually settable means normally operative to throw out the power feed at a given point; additional means driven continuously by said power means effective to render said power means ineffective at the normal extreme of sleeve movement in each direction of translation; manually operable means for imparting a slight further axial movement of said sleeve in either direction beyond the extremes available by said power means; and abutment means provided in the head cooperating with said additional manual means for positively stopping the axial translation of said spindle at a predetermined position beyond the point where the power means is rendered ineffective irrespective of the direction of spindle travel.

LAWRENCE LEE SCHAUER.